United States Patent

[11] 3,549,092

| | | |
|---|---|---|
| [72] | Inventor | Joseph Baxter, Jr.<br>Franklin, Ohio |
| [21] | Appl. No. | 6,041 |
| [22] | Filed | Jan. 26, 1970 |
| [45] | Patented | Dec. 22, 1970 |
| [73] | Assignee | The Black Clawson Company<br>Hamilton, Ohio<br>a corporation of Ohio<br>Continuation of Ser. No. 719,197,<br>Apr. 5, 1968, now abandoned |

[54] METHOD FOR THE TREATMENT OF GARBAGE AND OTHER WASTES
12 Claims, 6 Drawing Figs.

[52] U.S. Cl. ................................................. 241/15,
241/21, 241/24, 241/46.17, 241/68, 241/69, 241/79.1
[51] Int. Cl. ....................................................... B02c 1/00
[50] Field of Search ........................................... 241/15, 20, 24, 21, 30, 38, 46, 46.02, 46.04, 46.06, 46.08, 46.11, 46.13, 46.15, 62, 68, 69, 73, 74, 79, 79.1, 301

[56] References Cited
UNITED STATES PATENTS

| 2,418,547 | 4/1947 | Cowles | 241/21 |
|---|---|---|---|
| 2,572,767 | 10/1951 | Schlenz | 241/21 |
| 3,276,994 | 10/1966 | Andrews | 241/46 |
| 3,307,791 | 3/1967 | Nagai | 241/74 |
| 3,362,650 | 1/1968 | Tracy | 241/21 |

Primary Examiner—Gerald A. Dost
Attorney—Marechal, Biehel, French & Bugg

ABSTRACT: Refuse of all kinds commonly encountered in municipal waste material, such as raw garbage, rubbish, metal objects and other materials, are treated in an aqueous medium in a pulper by an impeller applying both mechanical and hydraulic forces thereto which compact the metal and other insoluble materials, while converting the organic, fibrous and other pulpable materials into a pumpable slurry. The several constituents of the mixture are sorted for individual disposal by extracting the pulped slurry from the pulper through a screen and by separately trapping and removing the compacted solid materials and the stringy materials such as wire and rope. In the preferred practice, the aqueous medium comprise sewage, the pulpable and soluble constituents of which are included in the slurry screened from the pulper.

PATENTED DEC 22 1970

INVENTOR

JOSEPH BAXTER, JR.

BY Marechal, Biebel, French & Bugg

ATTORNEYS

METHOD FOR THE TREATMENT OF GARBAGE AND OTHER WASTES

This application is a continuation of application Ser. No. 719,197, filed Apr. 5, 1968, and now abandoned.

BACKGROUND OF THE INVENTION

There has in recent years been a continuing great increase in the volume and variety of solid waste products requiring final disposition by municipalities. Much of this increase is attributable to the tremendous growth in the use of paper products in the packaging and marketing of foods and other consumer goods. Yet only very recently has significant public notice been taken of the expense and the archaic nature of the methods of waste disposal which are commonly used, and of the fact that municipalities must deal with the products of their own existence—refuse, problem wastes and body wastes——in a more economical and modern manner.

Problem wastes, typical examples of which include abandoned vehicles, street cleanings, tree debris, construction and demolition materials, furniture, and other bulky objects, are generally susceptible to disposal only at city dumps. Some problem wastes can be shredded or compressed, sold as scrap if reusable, or incinerated if not too bulky for the city incinerator. Even open air dumping of problem wastes is not totally unacceptable, because for the most part they do not present the health hazards of decomposable wastes such as garbage and sewage. Furthermore, the health hazards arising from the decomposable wastes have thus far been eliminated or controlled by the use of modern methods of treating sewage at modern sewage treatment plants.

The most critical problem facing municipalities today in the area of waste disposal is therefore concerned with the day-to-day accumulation of solid refuse. Such refuse, comprising both garbage and also rubbish and solid wastes from domestic and commercial sources, may be either putrescible—capable of being decomposed by micro-organisms with sufficient rapidity to cause gas and odor nuisances—or nonputrescible. Its disposal currently creates health hazards by polluting the air and water resources and by increasing disease-carrying rodents and insects, and these in turn create public nuisances and adversely affect land values. In addition, the difficulties of refuse disposal have been materially multiplied by advanced methods of packaging which result in a substantial increase in the mass of discarded nondegradable wastes, such as nonreturnable glass bottles, metal cans and paperboard packages, which possess great individual bulk.

Various approaches are now employed for compacting bulk refuse. Burning in an open dump is the most widely used method of disposing of combustible solid wastes. It is easy and inexpensive, but primitive, inefficient, unsightly and hazardous. Smouldering dumps contain heaps of incompletely burned putrescent wastes which attract rats and breed flies. The smoke emanating from such dumps pollutes the air, peels paint from houses, spreads disease, kills trees and is a bane to the beauty and health of a community. Rain drainage therefrom pollutes rivers and streams.

Hazardous and unsightly open dumps are slowly being replaced by sanitary landfills. By compacting and covering over each day's collection and refuse with a two-foot layer of dirt, this method successfully reclaims swamps, marshes and gulches, minimizes rodents and flies, and helps to eliminate odors and air pollution. Organic matter is subjected to slow anaerobic decomposition by fungi and bacteria so that after about ten years, the refuse becomes completely compacted and settles to 25—40 percent of its original volume.

Despite its advantageous qualities, sanitary landfill has several significant drawbacks. It requires large quantities of dirt and space, and necessitates the use of expensive bulldozers which remain idle most of the day. Even when the earth is spread quickly, the rats, flies, odors and unsightliness cannot be totally eliminated. Blowing paper cannot be effectively controlled, and bulky trash and raw sewage sludge cannot be accepted. Even garbage is not ideally suited to landfills because rain waters can leach the slowly decomposing organic matter and pollute streams and lakes. The increase in population and corresponding demand for land are causing a shortage of disposal sites for landfill.

Incinerators which reduce refuse volume by as much as 75 to 90 percent have been used by many large cities in an effort to cut the demand for landfill, but their odors and smoke output pollute the air and attract rodents and flies. Increasing recognition of the importance of air pollution by state and federal officials has necessitated the incorporation of expensive electrostatic precipitators or water sprays into incinerator systems already five to six times more expensive than landfill. Many systems are not designed for the temperatures required to burn up such substances as nonflammable paper dresses and certain plastic materials, which eventually clog the grates and considerably reduce incinerator efficiency.

Refuse composting has proved to be an uneconomical alternative to conventional methods of waste disposal. If garbage and other organic waste materials are subjected to an accelerated aerobic microbial action, a stable, odor-free, soillike material is produced in a matter of days. Because it contains little nutrient value, however, compost has potential only as a soil conditioner. It has not been able to compete with artificial fertilizers because it requires a fertilizer supplement in order to be an effective soil additive. As a result, many composting ventures have failed.

The problems existent in present methods of waste disposal illustrate the need for a new and improved method and means for reducing the amount of refuse and unsalvageable materials in an efficient and economical manner. There is also a need for an efficient method and means of disposing of refuse which can be applied simultaneously to raw sewage and/or animal manure, which are now treated separately with unnecessary duplication of effort.

Summary of the Invention

The present invention is concerned with two major considerations involved in the handling and disposal of solid refuse. One is the problem of physical bulk provided by the presence of materials which initially contain large volumes of air, such particularly as glass, metal and plastic containers of all kinds, and also paper products such especially as corrugated paperboard. The current rapid increase in the physical difficulties in handling and disposing of solid wastes is in large measure due to the bulk of such refuse, and would be considerably alleviated by provision for reducing and concentrating this bulk.

The other major consideration involved in the invention is the problem of sorting the mixed constituents of municipal waste which require different methods of ultimate disposal. For example, if the metal is to be recovered, it must be separated from the glass and other nonmetallic hard wastes, and it is also more efficient to separate the combustible materials from the noncombustibles. Furthermore, there are large quantities of refuse such as garbage which could be handled by pumping if it could be separated from the other solid materials.

The invention has as its primary objective the provision of methods and apparatus for dealing with both of the above considerations successfully and essentially simultaneously. More particularly, the invention proposes that the miscellaneous and totally unsorted wastes which are commonly collected in modern municipalities be subjected to a pulping operation in an aqueous medium in a container under conditions of mechanical and hydraulic action whereby the following results occur;

a. The organic and fibrous constituents are reduced in particle size until they form with the pulping medium a pumpable slurry which can be extracted from the container through a screen of suitably sized perforations and pumped to whatever further treatment stations are required.

b. The metal, glass and other hard materials are individually reduced to compact forms relatively free of voids capable of containing entrapped air and thus readily removable from the container by gravity action independently from the slurry for subsequent separation of the metal and nonmetal constituents.

c. The stringy materials, such as wire, rope and plastic sheeting, are separately removed for disposal, preferably be being progressively combined into a ropelike body removable upwardly from the container.

The invention thus accomplishes, by an essentially single treatment which can be carried out either continuously or as a batch operation, reduction of the bulk of the mixed waste to substantially the optimum minimum, and also separation of its constituents into the three major categories which are most readily handled separately in their ultimate disposal. Another important feature of the invention is that it includes the use of raw sewage as an aqueous pulping medium for the solid wastes, which offers a number of advantages, as now described.

When sewage is used as the pulping medium, it is then possible to deliver the pulped and extracted waste slurry, which will contain some sewage, into the existing sewage system of the municipality for subsequent treatment with the other sewage by conventional methods. An alternative procedure is to subject the extracted slurry to a preliminary thickening step, resulting in a pulped product which may be used for mulching and like purposes. In such cases, the liquid removed in the thickening step is available for return to the container for pulping with other mixed waste. Thus the invention provides the important advantage of minimal requirements of water, particularly when the initial water supply is sewage.

The invention further includes methods, apparatus and systems for carrying out the operations outlined above in such manner as to produce the advantageous results described, and the major objectives of the invention include the provision of such methods, apparatus and systems.

Description of Preferred Embodiments

Figure 1:
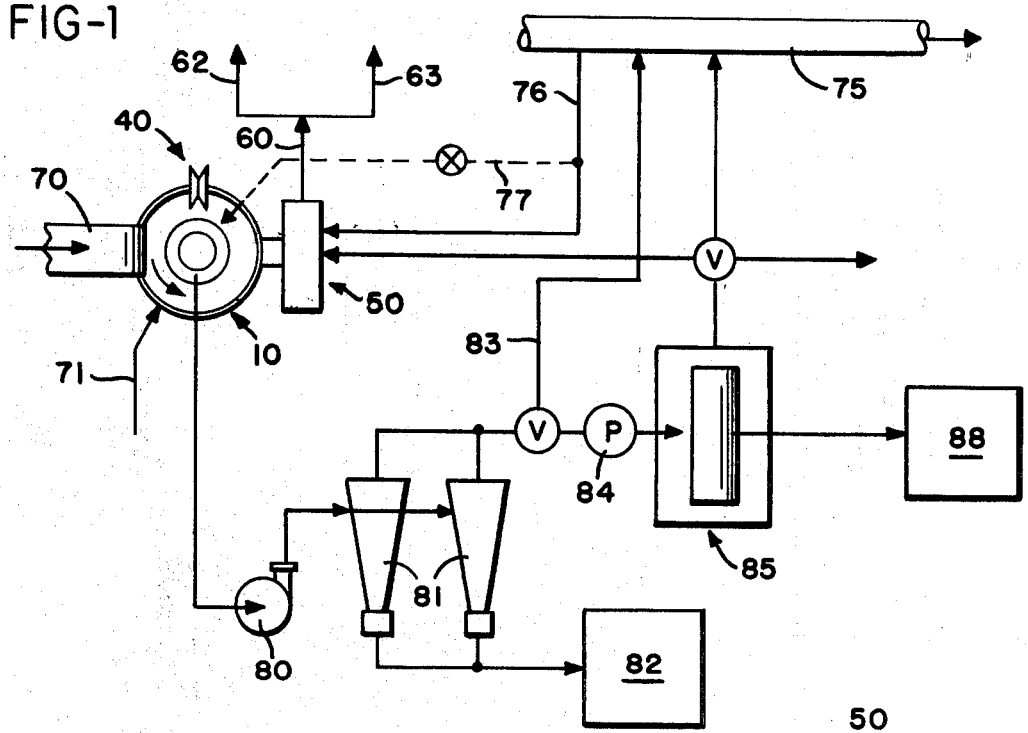
FIG. 1 is a diagrammatic plan view illustrating a complete system in accordance with and for carrying out the method of the invention.
Figure 2:
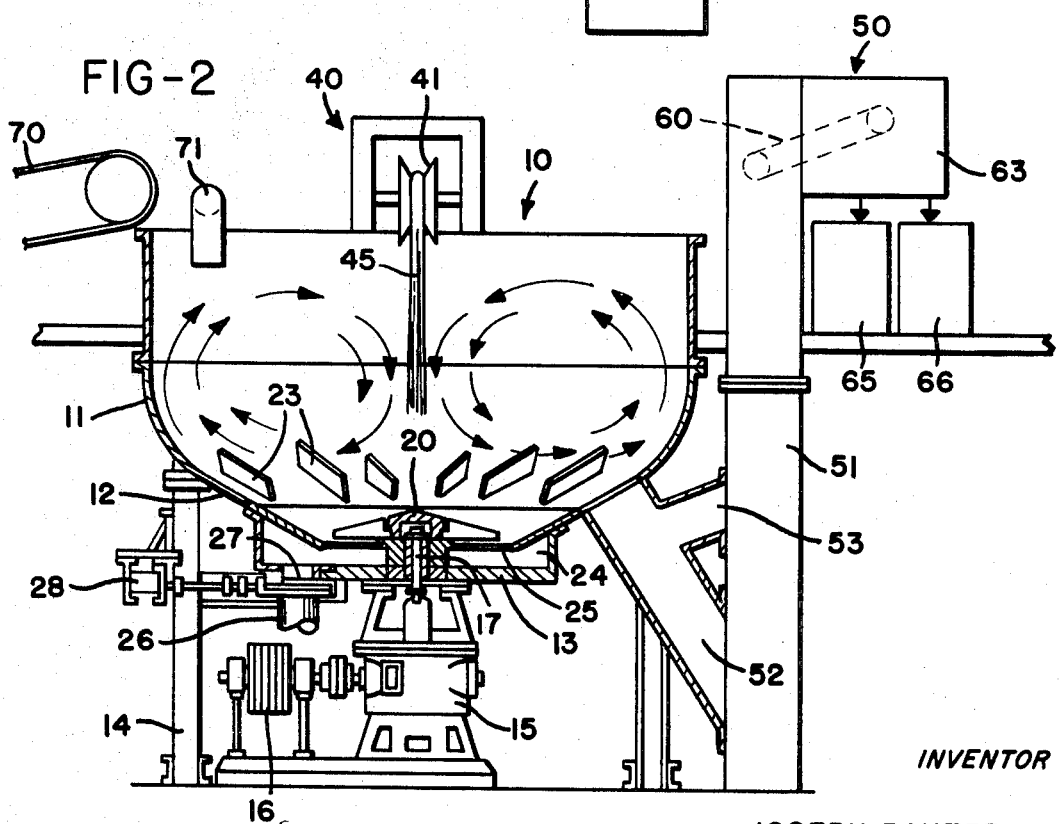
FIG. 2 is a view partly in side elevation and partly broken away in vertical section showing details of the pulper incorporated in the system of FIG. 1.
Figure 3:
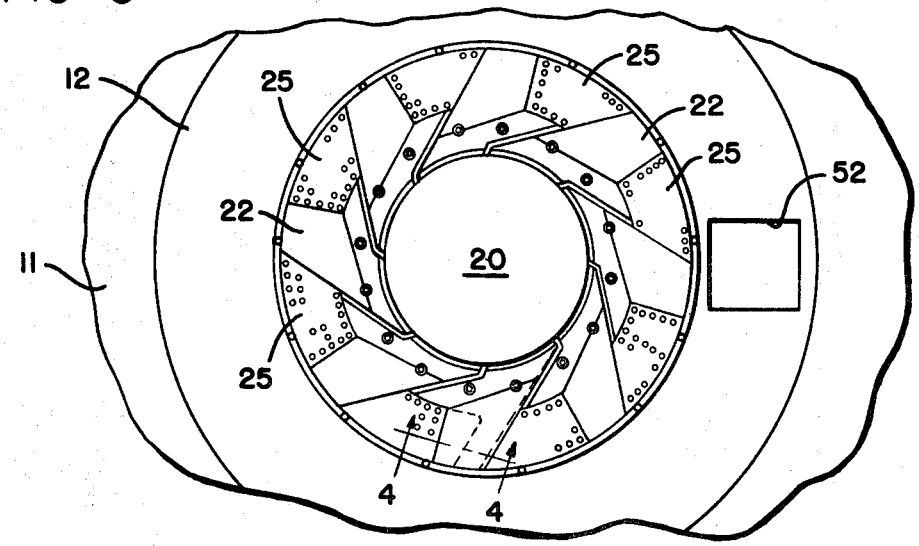
FIG. 3 is a plan view on a larger scale of a portion of the bottom of the pulper of FIG. 2.

In FIGS. 1 and 2, the apparatus for pulping, compacting and separating the constituents of mixed municipal wastes are shown as comprising a pulper 10 generally of the construction disclosed in Felton-Vokes U.S. Pat. No. 3,339,851, issued Sept. 5, 1967 to the assignee of this invention. This pulper includes a tub 11 having a cylindrically extending upper wall, an inwardly tapered lower wall portion 12 and a bottom wall 13, and it is carried by supports 14 of any suitable character. A gear drive 15 below the tub may be directly connected to any suitable prime mover and is shown as driven through a pulley 16 by a suitable drive motor (not shown). The gear drive 15 drives a vertical shaft 17 which supports a rotor 20 for rotation centrally of the bottom portion of the tub.

The rotor 20 includes a plurality of vanes 22 which in operation provide an effective circulation outwardly and then upwardly along the outer portions of the tub in a generally vortical pattern resulting in a return flow toward the impeller. Stationary guide plates 23 on the tapered wall portion 12 guide the upward flow of the suspension or stock in the tub. Adjacent the bottom of the tub is an annular chamber or compartment 24, and an annular perforate screen plate 25 immediately below the rotor vanes 22 permits the passage into chamber 24 of particles which have been sufficiently reduced in size to pass through the perforations of the screen plate 25. For preferred operation in the practice of the invention, these perforations are of relatively small size, preferably in the range of one-eighth to one-half inch in diameter, and the slurry passing therethrough may be withdrawn from the compartment 24, preferably continuously, by way of the conduit 26 and control valve 27, shown as having an operating cylinder 28.

Figure 4:
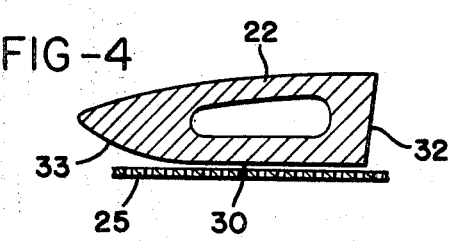
FIG. 4 is an enlarged fragmentary section on the line 4-4 of FIG. 3.
Figure 5:
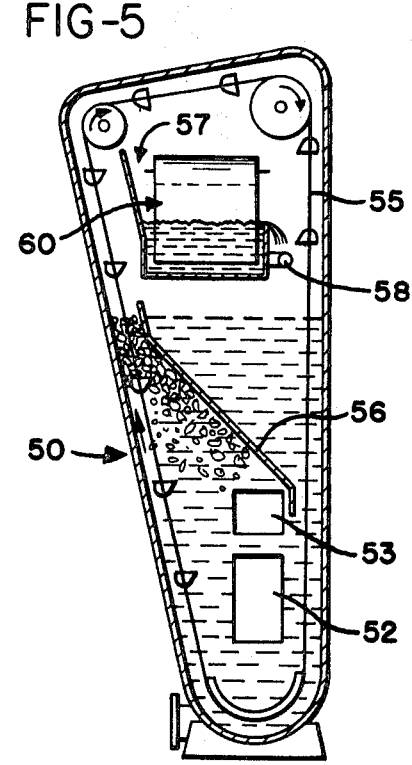
FIG. 5 is a side view, partly broken away, showing the junk-removing apparatus cooperating with the pulper in the system of FIG. 1.
Figure 6:
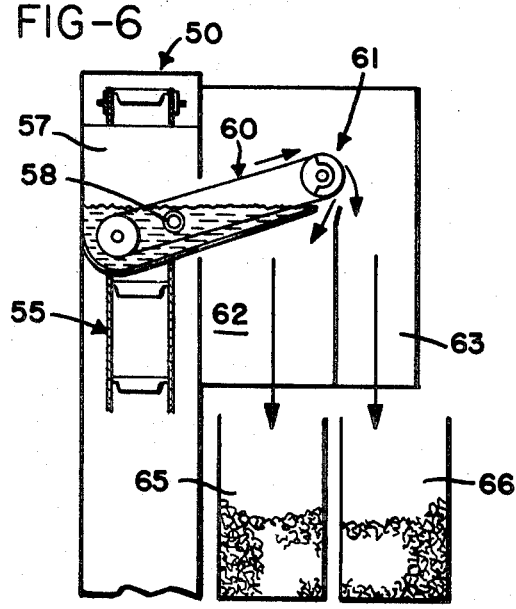
FIG. 6 is a fragmentary view in vertical section further illustrating the apparatus of FIG. 5.

The rotor 20 is shown as of essentially the construction disclosed in Vokes U.S. Pat. No. 3,073,535, issued Jan. 15, 1963 to the assignee of this invention. Each vane 22 accordingly has a substantially flat undersurface area 30 which is generally parallel with the upper surface of screen plate 25, and each vane also has a leading edge surface 32 which is essentially flat and of substantial area, as best seen in FIG. 4. In addition, this leading edge surface 32 is inclined toward the surface of the screen plate 25 so that as each vane rotates with the rotor, the surface 32 will not only produce a pumping action urging the slurry generally radially outwardly, but it will force the slurry downwardly toward the perforations in plate 25. The trailing end portion of each vane curves upwardly from the area 30, as indicated at 33 in FIG. 4, and this has the result of exerting a lifting action with respect to the screen plate and its perforations which is effective to lift away pieces of material which would otherwise tend to block the perforations, so that constant extraction from the tub is possible.

This construction of the rotor 20 and its vanes 22 produces maximum forces of hydraulic shear in the refuse, causing defibering of paper waste and disintegration of other organic and inorganic wastes. In addition, the action of the pulper is such that when operated at the proper liquid level, large quantities of air can be induced into the circulating mass thereby adding oxygen in such quantities as to be extremely beneficial in the reduction of B.O.D. (biochemical oxygen demand), thus further reducing the treatment load required at the sewage treatment plant down stream. The rotor also has a mechanical action which combines with the hydraulic action to reduce the size of non-degradable waste, such as metal cans, by striking them with such force as to have the effect of rolling them into balls, and the same action causes glass bottles and other frangible materials to be quickly broken into multiple small fragments. Other metal wastes of larger sizes are also rapidly compacted, while the vortical action in the tub causes wires and other stringy or nonfibrous sheet materials to be wound into a ropelike form for ready removal from above.

Provision is made for removing each of the two classes of solid waste from the tub 11 separately from each other and from the pulpable slurry which passes through the screen 25 into the conduit 26. The stringy materials are removed by a ragger 40 as disclosed in Cowles U.S. Pat. No. 2,340,511 issued Feb. 1, 1944 and comprising a reel 41 supported on the tub 11. In the use of this device, a length of barbed wire is initially suspended from the reel 41 into the tub, and then as the stringy materials in the tub are caused to wrap around the length of barbed wire to form a rope 45, it is gradually withdrawn from the tub by rotation of reel 41, by any suitable drive means (not shown). As this composite rope accumulates, it can be coiled or cut into lengths suitable for further disposal, as by incineration or burying, preferably for landfill purposes. The stringy materials may also be removed by other means, particularly if they are not present in sufficient quantity to form a rope, as by intermittent introduction from above of hooks which engage and remove the stringy materials.

The compacted metal and other hard or otherwise relatively infrangible material of too large particle size to pass through the screen plate 25 are separated from the slurry in the tub by gravity with the aid of a continuous junk remover 50 comprising a tower 51 positioned adjacent the tub 11. A chute 52 extends at a downward angle to the tower 51 from an opening in the wall section 12 of the tub 11, and a branch chute 53 extends upwardly to the tower 51 from an intermediate location in the top of the chute 52. Within the tower 51 is a continuous bucket-type conveyor 55.

In the operation of the pulper 10 with the junk remover 50, when metal and other hard materials are sufficiently compacted to eliminate air-trapping spaces therefrom they tend to circulate around the bottom portion of the tub until they fall by gravity into the chute 52. Similarly, whatever large pieces of light trash, such as large plastic pieces, as escape reduction in the tub or winding into the rag rope 45 will in time pass into the chute 52 and float up through the branch chute 53 into the tower 51, guided by a baffle 56. Both of these types of trash will then be picked up by the buckets of conveyor 55, carried above the liquid level in the tower 51, and dumped into a bin 57 which is continuously supplied with liquid at one or more ports 58 located below at least the upper rim of a belt conveyor 60 of wire mesh or other perforate material.

The construction of the junk remover 50 as described lends itself to the provision of means for separating reclaimable metal from other hard wastes. The belt conveyor 60 carries material dumped into bin 57 to the outside of tower 51 and operates in conjunction with a magnetic pulley 61 to discharge through a pair of chutes 62—63 to a pair of bins 65—66 for respectively receiving magnetic and nonmagnetic wastes. Subsequent handling of these materials depends upon their quality and utility. For example, the metals may be salvaged or buried, and the nonmagnetic wastes may be buried, or may be further sorted and/or crushed for use as aggregates, particularly in concrete for low load-bearing purposes.

FIG. 1 illustrates the application of the invention to a complete system for continuous processing of municipal wastes, in which the pulper 10 of the characteristics already described is the primary apparatus. It receives the waste continuously or intermittently from a conveyor 70, and it is also provided with a continuously available supply line 71 of fresh water for washup purposes, and also for initial charging of the pulper if desired.

In the preferred practice of the invention, while fresh water may be used for initial charging purposes, the aqueous pulping medium employed for continuous operation of the pulper is raw sewage from the sanitary sewage system of the municipality, which normally consists of water of a relatively low solids content of the order of 0.3 percent, and the line 75 of FIG. 1 represents such a sewer line. Supply line 76 leads from the sewer 75 to the ports 58 in the junk remover bin 57, from which the liquid delivered by the line 76 continuously overflows to provide a supply of liquid through the chutes 52—53 sufficient to maintain the proper operating level in the pulper tub, and also to wash back to the pulper whatever fibrous materials may have adhered to the junk delivered to the bin 57. A branch line 77 leads from the line 76 to the tub 10 for direct delivery of sewage to the pulper if desired.

The operation of pulper 10 as already described progressively reduces as much as possible of the solid wastes to a slurry form, and since the paper content of average municipal wastes now approaches 50 percent, considerably more than 50 percent of the particles in the slurry will be fibers. The balance will be of varied nature, ranging from organic materials derived from garbage and human waste to hard particles which can generally be grouped under the heading "grit." All of this material will be delivered to the chamber 24 and conduit 26 as soon as it is of sufficiently small particle size to pass through the perforations of screen 25.

The extracted slurry is pumped from the chamber 24 at appropriately high pressure by a pump 80 to suitable grit removers, shown as a plurality of liquid cyclones 81 connected in parallel for the removal of high specific gravity grit. This gritty material may be subsequently disposed of in sanitary landfills, or it may be suitable for use as aggregate in low load-bearing concrete. It is shown as delivered from the cyclones to a suitable bin 82, where it may be washed of whatever putrescible materials may have adhered thereto.

After removal of its gritty constituents, the slurry may be returned to the sewage line 75 by a line 83, or it may be delivered by a pump 84 to a conventional stock thickener 85 for increase of its solids content from approximately .5 percent to a range of 5—8 percent. The liquid extracted in the thickener 85 may be delivered to the sewer 75, or it may be returned to the pulper 10. The thickened sludge produced by the thickener can be handled in any conventional way, for example by delivery to an existing sewage treatment plant, incinerator, landfill or other disposal station represented at 88 in FIG. 1.

While all the water supplied to the pulper may be fresh water, the preferred practice of the invention is to use raw sewage for this purpose, for a variety of reasons. In the first place, this minimizes the demand for fresh water which is already acute in many areas, and substitutes water which has already been used and would otherwise be delivered directly to the sewage treatment plant. Additionally, the net result of the use of sewage as the water source for the practice of the invention means not only that there is no increase in the volume of water ultimately handled by the sewage treatment plant, but also that the solids load on the sewage treatment plant will be reduced, to the extent that suspended solid material is removed from the sewage with the other sludge formed in the practice of the invention.

The use of raw sewage as the liquid medium in the practice of the invention has the further beneficial result of mixing relatively nutrient-rich sewage with the initially nutrient-poor fibrous materials to provide a slurry capable of conversion into a soillike compost material having substantially greater value as a soil conditioner and fertilizer than conventional compost. The invention therefore has special advantages for use in municipalities having slaughter houses, since the animal wastes which accumulate in the adjacent feed lots can be treated as described along with the other municipality wastes to produce a nutrient-rich compost.

The system and method of the invention are capable of alternative uses to suit the need of a particular community. A relatively small community may prefer to use them in conjunction with a sanitary landfill project, and to bury the concentrated sludge along with other waste components. Because of the compacting action provided by the invention, settling will require a period of the order of two to five years, as contrasted with the ten years or more required when the waste is buried without preliminary treatment, and ultimate burial space requirements will be reduced by 50 percent or more. In order to concentrate its waste disposal operations, a city of medium size may use the invention in conjunction with a sewage treatment plant as well as sanitary landfill. A relatively large city can significantly reduce its collection and transportation costs by installing pulpers in accordance with the invention at several stations throughout the city, and then transporting the waste slurry by sewer line to a central sewage treatment plant.

While the methods and forms of apparatus herein described constitute preferred embodiments of the invention, it is to be understood that the invention is not limited to these precise methods and forms of apparatus, and that changes may be made therein without departing from the scope of the invention which is defined in the appended claims.

I claim:

1. A method of treating wastes comprising:
   a. depositing in a waste treatment tub an aqueous medium and waste material which includes:
      i. fibrous and other organic materials;
      ii. metallic and glass materials; and
      iii. stringy materials;
   b. establishing a vortical flow pattern in said tub while reducing at least said fibrous and other organic materials to at least a predetermined particulate size;

c. continuously extracting from said tub in slurry form some of said aqueous medium and that portion of said waste material which has been reduced to said predetermined particulate size; and d. removing from said tub, separately from said slurry, a portion of said metallic and glass materials, above said predetermined particulate size.

2. The method of claim 1 further comprising removing from said tub, separately from said slurry and said portion of said glass and metallic materials, a portion of said stringy material.

3. The method of claim 1 further comprising removing from said slurry, subsequent to the extraction thereof from said tub, a portion of said aqueous medium.

4. The method of claim 3 further comprising removing gritty materials from said slurry prior to said removal of said portion of aqueous medium therefrom.

5. The method of claim 4 further comprising conveying to said tub said portion of said aqueous medium removed from said slurry.

6. The method of claim 1 wherein said aqueous medium comprises sewage.

7. The method of claim 1 further comprising separating said portion of said metallic and glass materials, subsequent to the removal thereof from said tub, into magnetic and nonmagnetic fractions.

8. A method of treating refuse which includes garbage and other organic materials, paper and other fibrous materials, and metallic and other relatively frangible and infrangible inorganic materials, comprising the steps of:

a. mixing the refuse with aqueous liquid at a first treatment station;

b. subjecting the resulting mixture to mechanical and hydraulic shear forces until the relatively frangible materials therein are reduced to less than a predetermined particle size;

c. withdrawing the relatively infrangible materials from said mixture to a first recovery station;

d. extracting from said mixture a slurry consisting essentially of fibrous and other organic particles and relatively frangible inorganic materials below said predetermined particle size together with a portion of said liquid;

e. removing said relatively frangible inorganic materials from said extracted slurry to a second recovery station; and f. further processing the remainder of said slurry at at least one additional treatment station.

9. The method of claim 8 wherein said withdrawing step is carried out simultaneously with said step of subjecting said mixture to mechanical and hydraulic shear forces.

10. The method of claim 8 wherein all of said steps are carried out continuously, and further including the steps of supplying additional refuse to said first treatment station, and continuously supplying aqueous liquid to said first treatment station.

11. The method of claim 8 wherein said mixture is subjected to mechanical and hydraulic shear forces simultaneously with said mixing step at said first treatment station, and said withdrawing step is performed by subjecting said infrangible materials to the action of gravity in a passageway depending from said first treatment station.

12. The method of claim 11 wherein all of said steps are performed continuously, and including the further step of continuously supplying additional liquid to said first treatment station through said depending passageway to wash fibrous particles from said withdrawn materials back to said first treatment station.